(12) United States Patent
Rozich (10) Patent No.: US 6,783,679 B1
(45) Date of Patent: Aug. 31, 2004

(54) WASTE TREATMENT PROCESS

(75) Inventor: Alan Rozich, West Chester, PA (US)

(73) Assignee: PMC Technologies, Inc., West Chester, PA (US)

( * ) Notice: Subject to any disclaimer, the term of this patent is extended or adjusted under 35 U.S.C. 154(b) by 0 days.

(21) Appl. No.: 09/691,816

(22) Filed: Oct. 19, 2000

Related U.S. Application Data (60) Provisional application No. 60/160,359, filed on Oct. 19, 1999, and provisional application No. 60/169,655, filed on Dec. 8, 1999.

(51) Int. Cl.$^7$ .................................................. C02F 3/00
(52) U.S. Cl. .................................... 210/614; 210/748
(58) Field of Search ............................... 210/603, 604, 210/614, 622, 626, 746, 748

(56) References Cited

U.S. PATENT DOCUMENTS

| | | | |
|---|---|---|---|
| 3,547,814 A | 12/1970 | McWhirter | 210/7 |
| 3,670,887 A | 6/1972 | McWhirter | 210/5 |
| 4,026,793 A | 5/1977 | Rein | 210/12 |
| 4,246,099 A | 1/1981 | Gould et al. | 210/603 |
| 4,370,233 A | 1/1983 | Hayes et al. | 210/609 |
| 4,915,840 A | 4/1990 | Rozich | 210/605 |
| 5,141,646 A | 8/1992 | Rozich | 210/613 |
| 5,304,308 A * | 4/1994 | Tsumura et al. | 210/614 |
| 5,437,776 A * | 8/1995 | Schwabegger et al. | 205/761 |
| 5,492,624 A | 2/1996 | Rozich | 210/605 |
| 5,582,734 A * | 12/1996 | Coleman et al. | 210/614 |
| 5,624,565 A | 4/1997 | Lefevre et al. | 210/614 |
| 5,942,118 A | 8/1999 | Besten | 210/610 |
| 5,948,275 A | 9/1999 | Djafer et al. | 210/762 |
| 5,965,096 A | 10/1999 | Djafer et al. | 423/210 |
| 5,972,226 A | 10/1999 | Djafer et al. | 210/762 |
| 6,093,322 A | 7/2000 | Bongards | 210/614 |
| 6,126,838 A | 10/2000 | Huang et al. | 210/712 |

FOREIGN PATENT DOCUMENTS

EP 0 936 190 A1 2/1999 ............ C02F/3/12

* cited by examiner

Primary Examiner—Chester T. Barry
(74) Attorney, Agent, or Firm—Lerner, David, Littenberg, Krumholz & Mentlik, LLP (57) ABSTRACT

An integrated process for the treatment of organic waste comprising the steps of subjecting said organic waste to biological digestion with recycle of biosolids; contacting the resulting mixture of biosolids and unconverted organic material with one or more oxidizing agents in a chemical treatment unit; monitoring the oxidation-reduction potential (ORP) of the mixture of biosolids and unconverted organic material in the chemical treatment unit and adjusting the concentrations of the oxidizing agents to maintain the ORP within a selected range greater than 0 mV to condition the mixture so that it is more amenable to biodegradation; and returning the conditioned effluent to the biological reactor. The combined effects of improving biodegradability through chemical conditioning act and controlled recycle of biosolids act to reduce net biosolids production to nearly zero.

3 Claims, 11 Drawing Sheets

WASTE TREATMENT PROCESS

CROSS-REFERENCE TO RELATED APPLICATIONS

The present application claims benefit of U.S. Provisional Patent Application No. 60/160,359, filed on Oct. 19, 1999, and U.S. Provisional Patent Application No. 60/169,655, filed on Dec. 8, 1999, which are both hereby incorporated by reference herein.

FIELD OF INVENTION

The present application relates to improvements in processes and systems for the treatment of organic wastes, and in particular, to improvements in processes and systems to reduce net biosolids production in system that utilize biological treatment processes.

BACKGROUND OF INVENTION

Numerous processes have been developed to produce environmentally acceptable effluents through the biological treatment of organic wastes. In biological waste treatment processes, wastewater is contacted with active biosolids (i.e., biosolids containing live micro-organisms) to convert the organic components of the waste to a form that can be separated from the aqueous effluent. However, these processes, usually produce substantial quantities of sludge, consisting primarily of microorganisms and other biosolids in water, which must then be subjected to further processing and disposal, by methods such as incineration, disposal on land or in the ocean, and other chemical, biological or mechanical processes.

Sludge digestion, comprising further biological treatment of the biosolids, has been widely used to reduce the volume of sludge prior to disposal. The main drawback to this approach is that it requires long detention times and correspondingly large treatment systems. Many processes have been proposed to improve the efficiency of sludge digestion. For example, in U.S. Pat. Nos. 3,547,814 and 3,670,887, gross solids are first removed from the sewage by screening and the remaining waste contacted with an oxygen-containing gas and activated sludge.

Another technique for treating sludge involves extended aeration, which increases the degree of auto-oxidation of the solids, with a net reduction of biosolids production. Unfortunately, the rate of oxidation is generally too low to have a significant effect on net sludge production. Moreover, the large plant size and high operating costs of these systems often makes extended aeration impractical and uneconomic.

U.S. Pat. No. 4,246,099 discloses a combination of aerobic/anaerobic processes to reduce and stabilize biosolids produced by an activated sludge process. In one process, sludge from a municipal treatment plant is initially contacted with an oxygen-containing gas under aerobic treatment conditions to partially reduce the biodegradable volatile suspended solids and then anaerobically digested to partially stabilize the sludge. Thermal aerobic digestion, referred to in the reference as autothermal aerobic digestion (ATAD), is utilized, wherein the digester was operated at elevated temperatures, e.g., from about 45° C. to 75° C., or in the thermophilic range. The anaerobic step is used to solubilize organic compounds biologically, and stabilize the sludge solids. The combination of processes purportedly reduces biosolids in the sludge to less than 40% of the biodegradable volatile suspended solids introduced to the digestion zone.

U.S. Pat. No. 4,026,793 discloses an aerobic digestion process for reducing the solids content in a biodegradable organic sludge by carrying out the digestion in a vessel maintained at a temperature within the range of 38° C. to 46° C.

European Patent Application EP 0936190 discloses a process wherein solids separated from a biological treatment step are subjected to wet air oxidation to improve the biodegradability of the biosolids or solid waste and return it to the biological reactor. The chemical treatment step entails the use of an oxidant gas such as air or pure oxygen and treatment at temperatures in the range of 80° to 200° C. and pressures of 1 to 40 atmospheres. The pH of the reaction may range from 1 to 11 and reaction times may range from 10 to 180 minutes. The oxidants are added to the waste mixture in a selected stoichiometric ratio based on the estimated COD of the waste, which generally results in the use of amounts of chemical reagents far greater than are actually needed. Wet air oxidation (WAO) schemes are also expensive and difficult to control and operate. For example, as the waste composition changes, it becomes necessary to increase the reaction temperature and pressure to successfully treat more recalcitrant wastes. Accordingly, plant equipment must be designed for the highest conditions of pressure and temperature that are anticipated. The WAO process design also does not define or recognize all of sludge recycled to the bioreactor in controlling solids production.

U.S. Pat. No. 5,948,275 discloses the use of WAO to treat biosolids with recycle of the biosolids to the WAO process. A primary objective of such treatment is to convert biosolids to gases by the WAO process. The possibility of extracting a partially oxidized effluent for biological treatment is also disclosed.

U.S. Pat. Nos. 5,965,096 and 5,972,226 disclose the use of multiple oxidants to destroy a mixture of biosolids and organics in a WAO process. Oxidants are added in stoichiometric ratios to the COD of the mixture.

U.S. Pat. No. 6,126,838 employs Fenton's reagent to catalyze oxidization of a high-strength organic waste stream with continuous electrolytic regeneration of the catalyst outside of the oxidation step.

In previous patents, this applicant has disclosed improved sludge digestion processes that employ chemical hydrolysis or chemical oxidation steps to improve the biodegradability of cellular materials and unconverted organic compounds. U.S. Pat. No. 4,915,840 to Rozich discloses an improvement for sludge reduction in an aerobic process for municipal waste. Sludge reduction is controlled by contacting a portion of the biosolids and nonconverted organics with acid or base to hydrolyze macromolecular organic substances and dissolve inorganic substances in the waste stream. This hydrolytic assist modifies the macromolecular components of the cell structures and renders them essentially soluble, thereby enhancing the ability of the biologically active organisms to effect thermophilic decay within the bioreactor.

U.S. Pat. No. 5,141,646 to Rozich discloses a process wherein sludge is charged directly to an ATAD to provide immediate digestion. During quiescent periods, a portion of settled biosolids is then removed from the ATAD reactor and charged to a chemical hydrolysis unit for treatment with a strong acid or base solution. The hydrolyzed stream is mixed with the incoming sludge, which is then fed directly to the ATAD.

U.S. Pat. No. 5,492,624 also to Rozich discloses a process for the treatment of organic waste wherein a chemical oxidation step is employed in place of the chemical hydrolysis step employed in the '840 or '646 patents. Chemical oxidation substantially reduces the chemical oxygen demand (COD) of the organic material, improving the efficiency and lowering the overall oxidation demand in the ATAD reactor. The process does not generate the copious amounts of dissolved solids produced by the addition of the acids or bases needed to promote chemical hydrolysis. Dissolved solids can adversely affect the biological treatment step and other downstream treatment processes that may be present. Another advantage of this process is that the solubilization effected by the elevated temperatures in the ATAD takes place before the chemical oxidation step, thus avoiding the redundancies or inefficiencies present in the prior art. The chemical oxidation step is often carried out at temperatures above the atmospheric boiling point of the waste to oxidize recalcitrant compounds. The required temperatures can swing across a broad range as the composition of the influent changes. In such cases, the chemical oxidation equipment is designed for the highest temperatures and pressures that are expected to occur during treatment.

As can be seen from the review of the art pertaining to biological treatment processes, many methods have been proposed in an effort to reduce or minimize sludge production and to stabilize excess sludge produced by aerobic processes. Most of these processes, become quite complex, and, as a result, the operating and capital costs become quite high. Moreover, it is extremely difficult to modify most biological treatment processes to economically achieve substantial sludge reduction, based on original organic input, let alone eliminate sludge production, i.e., to achieve "a zero sludge system." Indeed, the latter goal is one often sought but seldom achieved unless expensive intervening physical separation processes such as dewatering and subsequent incineration are employed.

SUMMARY OF THE INVENTION

Processes and systems for reducing sludge produced during biological treatment processes are disclosed. One aspect of the present invention relates to methods for biological treatment of organic waste in which, after subjecting the organic waste to biological digestion, at least a portion of the mixture of biosolids and unconverted organic material is transferred to a chemical treatment unit where it is contacted with at least one oxidizing agent in the chemical treatment unit at a high oxidation/reduction potential (ORP) that is controlled by monitoring ORP of the biosolids/organics mixture and adding oxidizing agents to the mixture as needed to maintain ORP at the selected high level. By maintaining the ORP of the biosolids/organics mixture in the chemical treatment unit at sufficiently high levels, i.e., 0 mV and greater, a highly conditioned effluent can be produced thereby resulting in substantial improvements in biodegradability when the conditioned effluent subsequently is subjected to further biological digestion.

Although not limited to any one theory, the use of ORP to guide the oxidation process is believed to more efficiently control effluent quality independent of the specific oxidizing agents employed because ORP is more directly related to the activity of the oxidizing agents in the mixture. The adjustment of the chemical oxidizing agents based on ORP is also believed to eliminate many of the problems that arise when oxidizing agents are added according to stoichiometric estimates, including, for example, eliminating the need to continually adjust the reaction temperature and pressure to accommodate changes in influent composition, eliminating the risks of underestimating the extent of waste oxidation, and reducing chemical wastage.

In accordance with this aspect of the present invention, a process is provided for the biological treatment of organic waste, comprising:

(a) feeding organic waste to a biological reactor and subjecting the organic waste to biological digestion so as to convert at least a portion of the organic waste to a clear decant and a mixture of biosolids and unconverted organic material;

(b) contacting a least a portion of the mixture of biosolids and unconverted organic material with at least one oxidizing agent in a chemical treatment unit;

(c) monitoring the oxidation-reduction potential (ORP) of the mixture of biosolids and unconverted organic in the chemical treatment unit and adjusting the concentration of the oxidizing agent to maintain the ORP of the mixture at greater than 0 mV so as to convert the biosolids and unconverted organic material to a conditioned effluent; and (d) returning the conditioned effluent to the biological reactor for further treatment.

In one embodiment of this aspect of the invention, the ORP level of the biosolids/organics mixture is monitored, and a single chemical oxidant, such as oxygen gas, is added to the waste mixture to maintain the ORP at the desired level.

In another embodiment, the ORP of the biosolids/organics mixture is monitored and combinations of chemical oxidants, such as oxygen, permanganate, peroxide, etc., and chemical catalysts, such as ferrous sulfate, peroxide, acid or base, etc., are added to maintain the ORP at the desired level.

In another embodiment of the invention, the ORP of the biosolids/organics mixture is monitored and electrolytic decomposition (electrolysis) of the aqueous mixture is used to generate hydroxy radicals to maintain the ORP at the desired level.

In another embodiment, ORP of the biosolids/organics mixture is adjusted in sequential steps to promote more efficient sludge reduction. The biosolids/organics mixture is contacted with a first oxidizing agent to adjust the ORP of the mixture to about 0 mV or greater, and then the ORP of the biosolids/organics mixture is contacted with a second oxidizing agent to adjust the ORP of the mixture to about +200 mV or greater while the mixture is reacted.

In yet another embodiment, the ORP of the biosolids/organics mixture is adjusted to about +500 mV or higher by the addition of oxidants according to any of the processes disclosed herein and refluxed at pressures near one atmosphere.

The present invention also relates to the integration of various chemical and physical treatment processes into biological treatment systems to achieve substantial reduction in net sludge production approaching zero net sludge production. In an embodiment of this aspect of the present invention, various methods for maintaining the system net growth rate at less than about 0.05 day$^{-1}$ or increasing respiration rate of the active organisms are integrated with ORP-based control of the chemical oxidation. By maintaining the system net growth rate at less than about 0.05 day$^{-1}$, biosolid production is minimized in the biological system, thereby minimizing the recirculation of carbon through the system.

Various methods for maintaining the low system net growth rate are disclosed, including separating a portion of the biosolids/organics mixture produced in the biological reactor and recycling it to the biological reactor to control the system net growth rate. Other methods for controlling system net growth rate may also be used, including addition of mature cells to the bioreactor and addition of enzymes to the bioreactor influent to increase biosolids respiration rates and manipulate cell yields.

So that the manner in which the above-recited aspects of the invention are attained can be understood in detail, more particular descriptions of the invention are made by certain embodiments of the invention, examples of which are illustrated in the accompanying drawings. While the invention will be described in reference to the preferred embodiments, it will be appreciated that the preferred embodiments are not intended to limit the invention to the embodiments and that various substitutions and modifications may be made to the invention disclosed without departing from the spirit and scope of the invention.

DETAILED DESCRIPTION

As used in the present disclosure, "a biological treatment process" or "biological treatment" means any biological treatment process known in the art, including, for example, aerobic, anaerobic or facultative processes.

Aerobic processes are biological treatment processes that occur in the presence of oxygen, and include, for example, autothermal aerobic digestion (ATAD) processes, such as those described in U.S. Pat. Nos. 5,492,624 and 4,915,840.

Anaerobic processes involve the biological decomposition of organic and inorganic matter in the absence of oxygen gas, and have most commonly been used to digest biosolids, but have also been used in suspended-solids contact processes to stabilize high-strength soluble wastes.

Facultative processes involve the biological decomposition organic and inorganic matter in which the microorganisms are indifferent to the presence or absence of oxygen. Conventionally in facultative processes, the reactor contents in such systems have been unheated and unmixed, but heated, suspended-growth processes may be used to reduce the time required to digest the biosolids.

"Respiration," as used in this disclosure, is the measure of cellular metabolic activity in the biosolids, specifically, of the rate at which the biosolids convert organic materials in the process stream to gaseous form. For an aerobic system, respiration may be determined by the rate of oxygen uptake by the biosolids or the rates at which carbon dioxide and other gases are generated. Other means of determining respiration are available for anaerobic and facultative processes.

As used in the present disclosure, "chemical oxidation demand" (COD) is an expression of the amount of oxygen that is theoretically necessary to convert the combined biosolids and organic waste streams to carbon dioxide.

As used in the present disclosure, the "oxidation-reduction potential" (ORP) of a mixture, such as the biosolids/organics mixture, is a measure of the potential of the mixture to drive oxidizing or reducing reactions. ORP is expressed in units of electromotive force, typically in millivolts (mV), where a positive quantity indicates a tendency to drive oxidizing reactions and a negative quantity indicates a tendency to drive reducing reactions.

As used in the present disclosure, "electrolysis" refers to the dissociation of water to form hydroxy radicals by applying an electromotive potential across a portion of the aqueous stream. In the present invention, electrolyzed water may be added to the waste stream, or a portion of the waste stream may be electrolyzed directly.

The present invention employs biological treatment and chemical treatment in an integrated system to convert organic waste streams to carbon dioxide and other gases with, essentially, zero net sludge production. Generally, the process for the biological treatment of waste according to the present invention includes subjecting the organic waste to biological digestion for a predetermined time and transferring at least a portion of the mixture of biosolids and unconverted organic material to a chemical treatment unit where it is contacted with at least one oxidizing agent in the chemical treatment unit. The conditioned effluent is then returned to the biological treatment process. The process uses monitoring of a specific parameter to optimize and control the chemical treatment process, thereby producing a highly conditioned effluent, which is subsequently returned to the biological reactor for further treatment.

FIGS. 1–11 present selected embodiments of the present invention. However, it should be understood that unless otherwise indicated, the specific details set forth are merely illustrative and not meant to be limiting. Moreover, certain features, such as locations and types of monitoring points, oxidant storage vessels, and equipment for flow control and equalization, are omitted for clarity. Their arrangement and integration in the systems and processes of the present invention would be known to one skilled in the art. Furthermore, although the selected embodiments are presented as continuous processes, the invention may be readily adapted to batch and semi-continuous processes, and various reactor designs, by techniques that are well known in the relevant arts.

Figure 1:
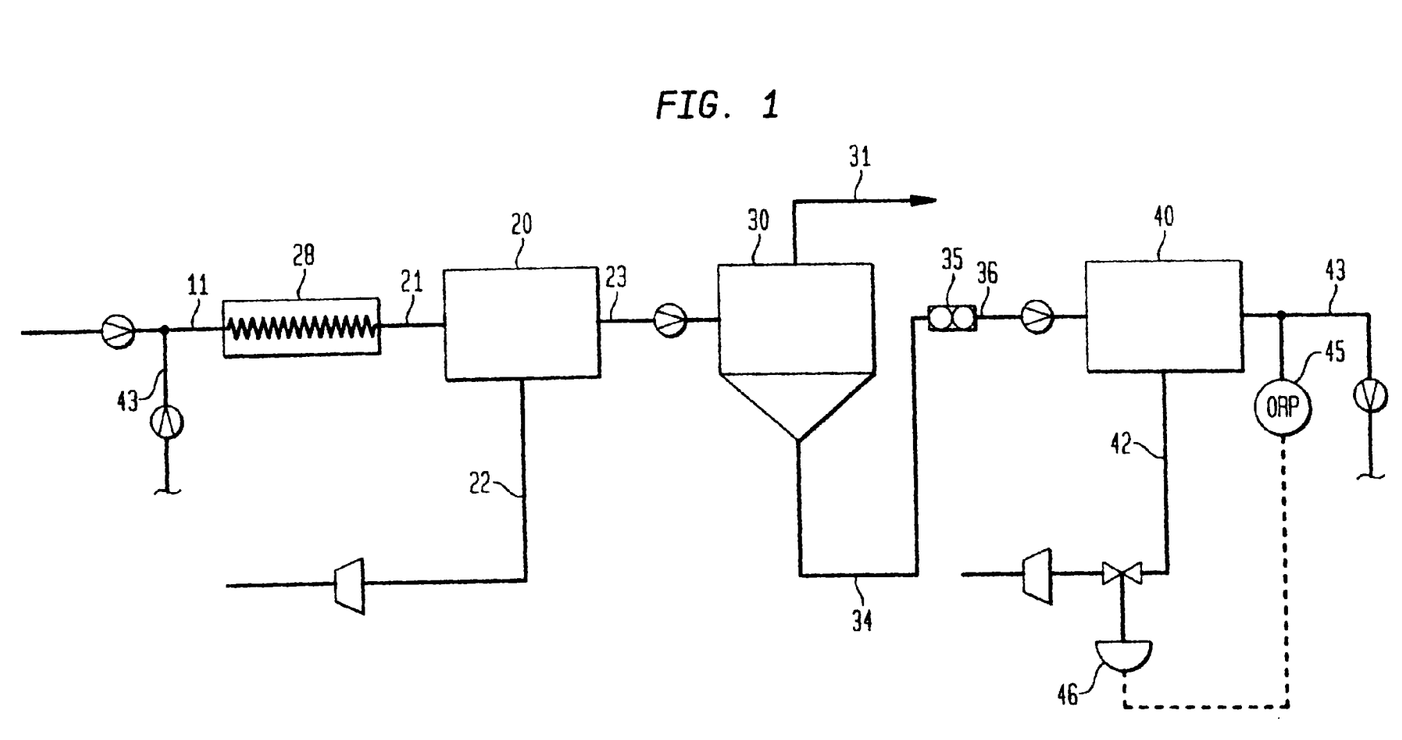
FIG. 1 is a block diagram of an integrated waste treatment system comprising biological treatment and direct monitoring and control of oxidation-reduction potential in a single-stage chemical oxidation process.

As illustrated in FIG. 1, in a preferred embodiment of this aspect of the present invention, an aqueous waste stream 11 containing organic material mixes with the effluent 43 returned from the chemical treatment unit 40. Preferably, these two streams 11 and 43 are mixed in a mixing device 28 to form influent 21. Mixing device 28 may be an inline static mixer or any suitable mixing device known to the art. Influent 21 is then discharged to bioreactor 20 for biological treatment. Preferably, oxygen is supplied to the bioreactor as compressed air 22. Most preferably, the compressed air is enriched with oxygen, up to about 50%. Gases produced by microbial degradation of the organic material, along with excess air, may be collected from the bioreactor 20 for further treatment (not shown) or vented to the atmosphere (not shown). The reactor contents 23, containing biosolids and unreacted organic material, are discharged, preferably to a gravity settling tank 30, where biosolids and treated effluent separate as two or more layers because of their differing densities. Other solids separation process known to the art may be used, including, for example, membrane separation, dissolved air filtration (DAF), cavitation air filtration (CAF), or a ballasted flocculation reactor (BFR). Excess foam produced in the bioreactor may be transferred directly to the chemical treatment unit 40 for further processing (not shown). The clear upper layer in settling tank 30 is drawn off as effluent 31, which may be discharged or subjected to further treatment (not shown). The lower layer, containing biosolids and unreacted organics, is drawn off as a biosolids/organics stream 34. In some applications, the functions of bioreactor 20 and settling tank 30 may be performed by a single unit.

Preferably, the biosolids/organics stream 34 is passed through a particle size reduction unit 35 to create biosolids particles of a known size distribution in biosolids/organic stream 36, thereby improving the efficiency of subsequent treatment. Particle size reduction is discussed in more detail below.

Biosolids/organics stream 36 discharges to chemical treatment unit 40 where the biosolids and unreacted organic material are partially oxidized. The chemical treatment process improves the degradability of the waste, increasing the rate at which the organic material is mineralized to carbon dioxide. In accordance with the present invention, the quality of effluent 43 and optimization of the biological process is controlled by monitoring the ORP of the effluent 43 and adding oxidant 42 as needed to maintain the selected ORP. ORP monitor 45 and flow controller 46 may comprise any device suited for these purposes; a variety of such devices are known in the art. Because ORP is used as the control parameter, ORP monitor 45 and flow controller 46 may be automated to operate independently of the specific oxidants that are being added. In accordance with this approach chemical oxidants can be added in response to real-time measurements of chemical activity rather than by adding chemical oxidants in a predetermined ratio to the estimated COD of the mixture. The use of an oxidizing agent at relatively high temperatures converts the cellular material and unreacted organics in the biosolids to more soluble forms that, consequently, are more readily biodegradable. By controlling to a selected ORP level, the rate of chemical addition can be varied to solubilize organics to the optimum degree to control effluent quality and decrease rates of chemical usage more effectively than is allowed by controlling the stoichiometric ratio of oxidants to COD.

Preferably, ORP is maintained at 0 mV or higher. More preferably, ORP is maintained at +200 mV or greater. The preferred reaction conditions for oxidation in the preferred ORP ranges include about neutral pH, relatively high temperatures of about 120° to about 300° C. and relatively high pressures of about 2 ATM to about 10 ATM. As the ORP of the waste stream is increased, lower temperatures and pressures may be used to achieve the optimal treatment efficiencies. For example, at ORP values of about +500 mV and greater, the biodegradability of the biosolids/organics mixture may be effectively improved by refluxing the mixture at atmospheric pressures. Skilled practitioners will recognize that other parameters, such as detention time, will vary depending on reaction conditions, the desired effluent quality, and the nature of the waste streams undergoing treatment.

Any chemical oxidant suitable for waste treatment may be used, including, for example, compressed air, oxygen-enriched air, oxygen gas, permanganate, peroxide or some other hydroxy radical producer. Preferably, oxidant 42 is compressed air, oxygen-enriched air or oxygen gas. Most preferably, oxidant 42 is compressed air, enriched with oxygen to about 50%.

However, oxidant 42 may comprise combinations of chemical oxidants. The use of multiple oxidants allows for greater flexibility in waste treatment. Preferably, oxidants are selected to provide the most economic treatment regime for the particular range of wastes that may be present. Moreover, since ORP may be controlled independently of the specific oxidants that are used, different combinations of chemical oxidants, or of oxidants and catalysts (e.g., ferrous sulfate, peroxide, pH adjustment, etc.), may be substituted to accommodate changes in the influent waste stream 11 or requirements for effluent 31.

Oxidant 42 may also be created in situ by electrolysis of water to produce hydroxy radicals. Electrolysis may be used alone or in combination with other chemical oxidants to increase the ORP of the waste stream to the desired levels. Preferably, the water is electrolyzed by applying a direct current across an array of electrodes in a contact chamber.

After treatment in chemical treatment unit 40, the resulting conditioned effluent 43 is, preferably, then returned to the head of the process, where it is mixed with aqueous waste stream 11 and discharged to bioreactor 20 for further treatment. Optionally, grit or other heavy inorganic particles may be removed from effluent 43 before effluent 43 is returned to bioreactor 20. Alternatively, grit or other heavy inorganic particles are allowed to accumulate in bioreactor 20. The concentrated grit or other heavy inorganic particles are removed after the chemical treatment step using suitable degritting or inorganic grit removal techniques (not shown).

Figure 2:
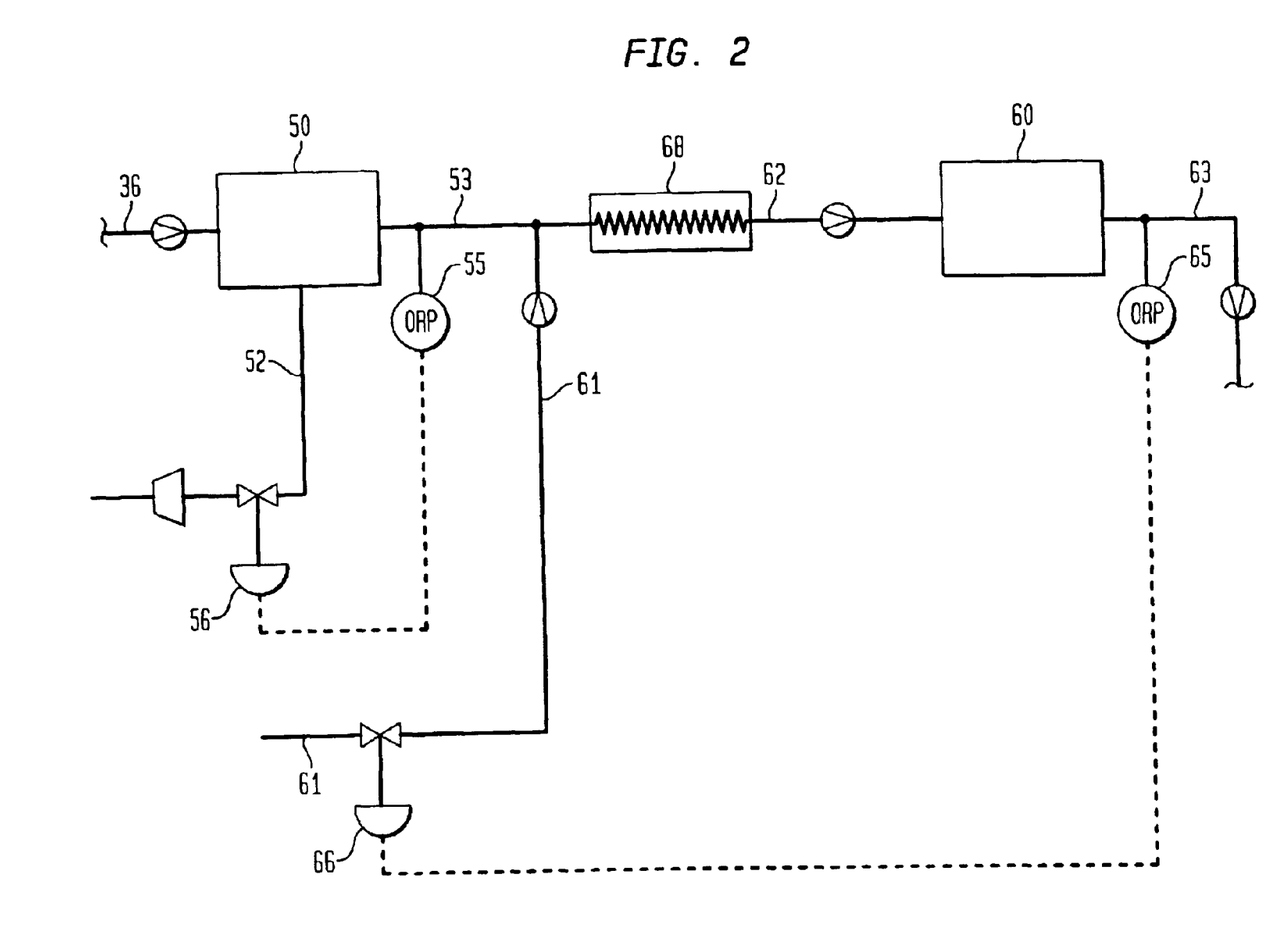
FIG. 2 is a block diagram of a two-stage chemical oxidation comprising monitoring and control of oxidation-reduction potential at each stage.

FIG. 2 presents a chemical treatment process using two oxidants in sequential steps. Biosolids/organics stream 36 is discharged to the first chemical reactor 50. Preferably, the ORP of the reactor contents 53 is controlled at about 0 mV or higher utilizing ORP monitor 55 and flow controller 56 to control the addition of oxidant 52 to reactor 50. Preferably, oxidant 52 is compressed air, oxygen-enriched air or oxygen gas. Most preferably, oxidant 52 is compressed air enriched with oxygen to about 50%. Other reaction conditions are as described for the chemical treatment step in FIG. 1.

The contents of the first chemical reactor 50 are drawn off as effluent 53, which is then mixed with oxidant 61. Preferably, mixing takes place in mixing device 68, forming influent 62, which is then discharged to a second chemical reactor 60. Preferably, the ORP of the reaction mixture is controlled at +200 mV or greater. Oxidant 62 may be any chemical oxidant suitable for wastewater treatment. Preferably, oxidant 62 comprises an aqueous solution of permanganate, peroxide, or some other hydroxy radical producer to serve as a catalyst/initiator for the oxidation reactions. Most preferably, oxidant 62 is a solution of peroxide. Other preferred reaction conditions are the same as discussed for the chemical treatment process of FIG. 1. The contents of the second chemical reactor 60 are drawn off as effluent 63 and returned to the head of the treatment system for treatment in bioreactor 20.

Using oxidizing agents in combination allows optimization of the biodegradation rates for wastes of varying compositions, in order to realize the greatest increase in biodegradability for the lowest cost. Preferably, the bulk of the oxidizing agent is added when the ORP of the influent is at a value of about 0 mV or higher, that is, after treatment in the first chemical reactor 50. This promotes the effectiveness of the oxidizing agents in enhancing the biodegradability of the targeted materials.

Figure 3:
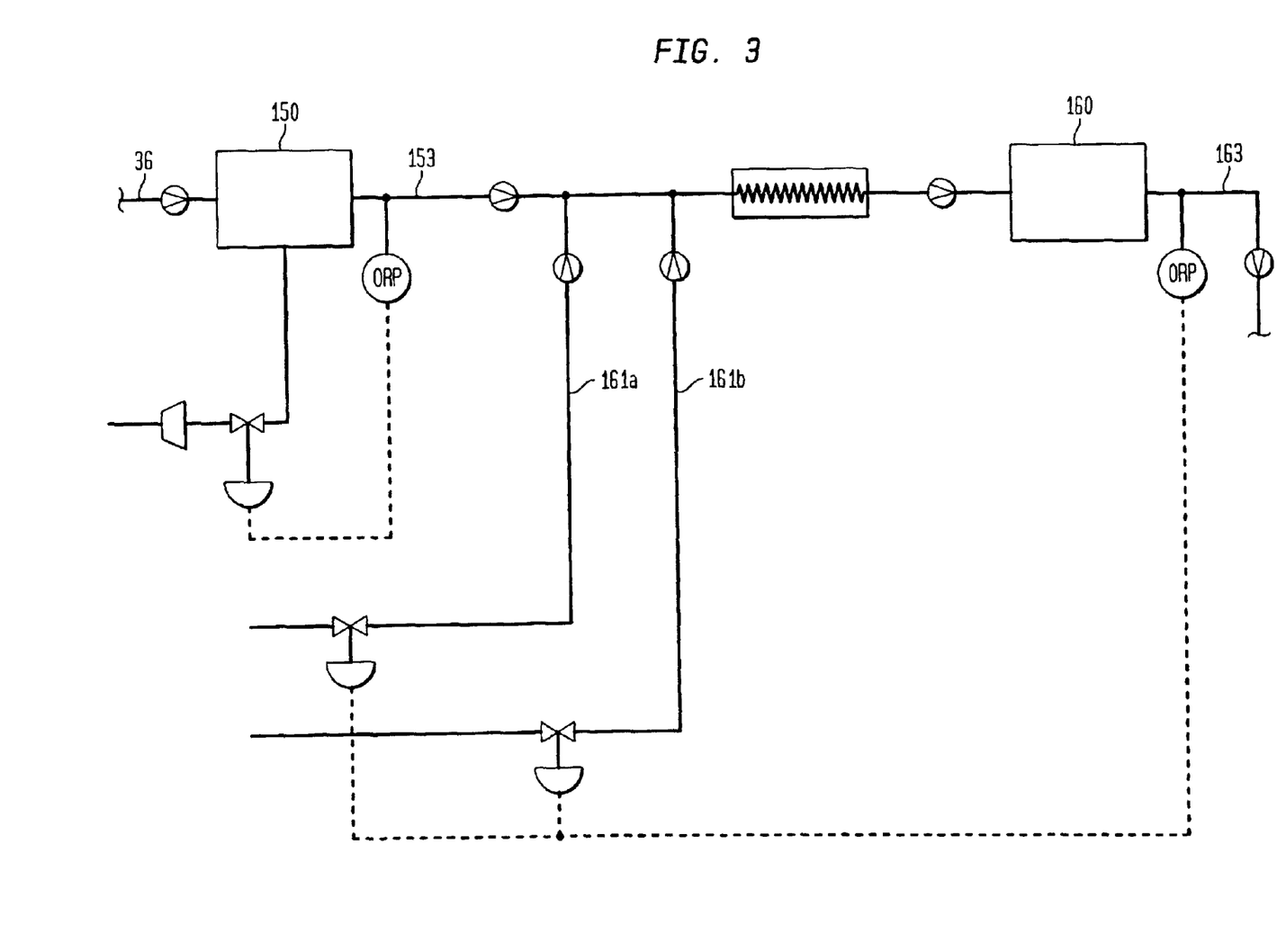
FIG. 3 is a block diagram of a two-stage chemical oxidation process comprising addition of multiple oxidants at the second stage.
Figure 4:
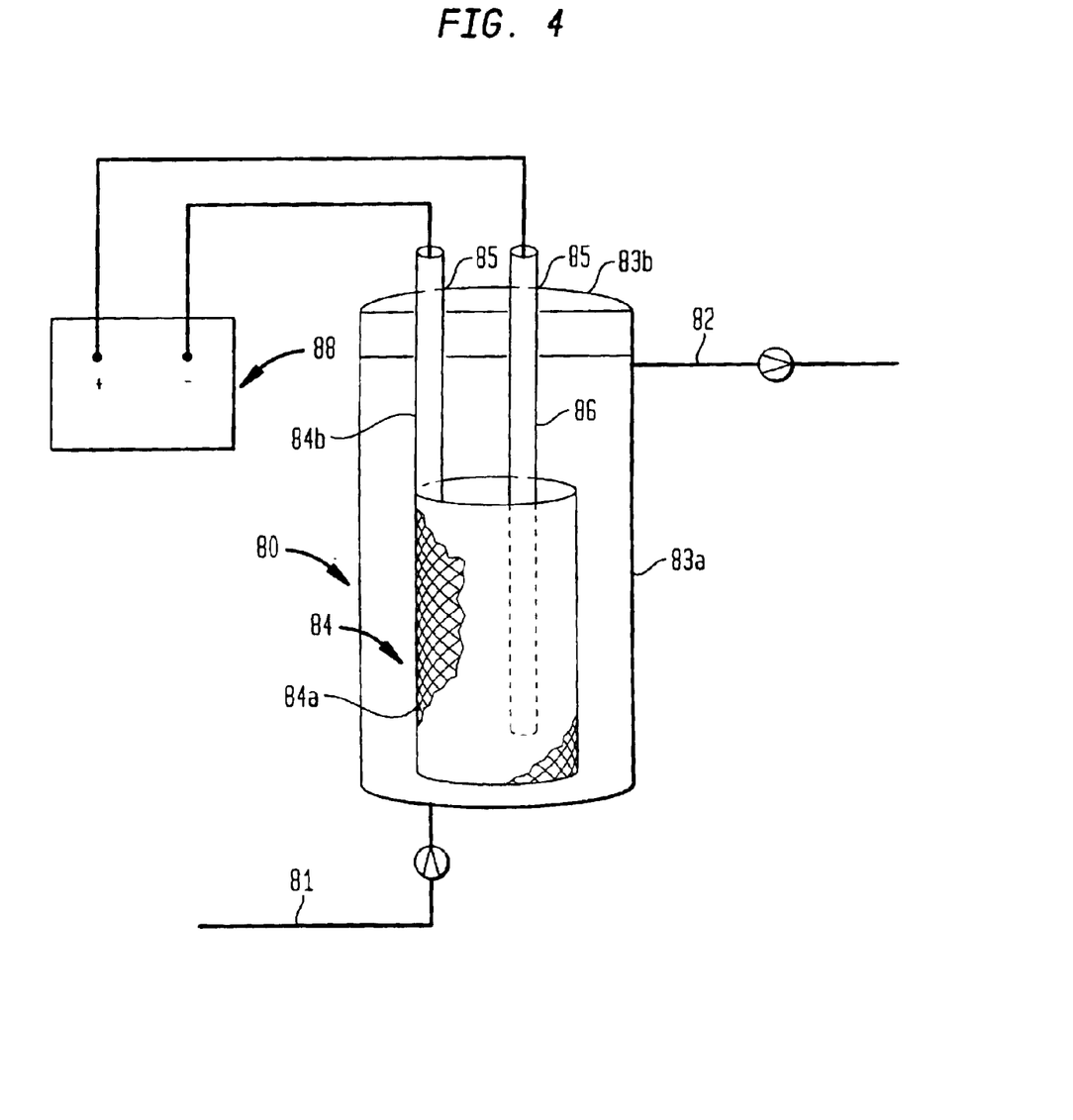
FIG. 4 is a schematic diagram of an electrolysis contact chamber.

FIG. 3 presents an embodiment of the present invention related to that of FIG. 2. Effluent 36 is discharged to first chemical reactor 150 where it is treated at a controlled ORP of 0 mV or greater. Chemical oxidants 161a, 161b are mixed with effluent 36 and discharged to second chemical reactor 160 for treatment at an ORP preferably controlled at +200 mV or greater. Addition of multiple oxidants allows for greater flexibility in waste treatment. Preferably, oxidants 161a, 161b are selected to provide the most economic treatment regime for the particular range of wastes that may be present. Different combinations of chemical oxidants, or of oxidants and catalysts (e.g., ferrous sulfate, peroxide, pH adjustment, etc.), may be substituted at 161a, 161b to accommodate changes in the influent waste stream 11 or requirements for effluent 31.

In another aspect of this invention, an oxidizing agent is created in situ by electrolysis of water to produce hydroxy radicals. Electrolysis may be used alone or in combination with other chemical oxidants to increase the ORP of the waste stream to the desired levels. Preferably, the water is electrolyzed by applying a direct current across an array of electrodes in a contact chamber. An example of a contact chamber 80 is presented in FIG. 4. The chamber 80 comprises container 83a with sealable lid 83b. Cathode 84 and anode 86 are located inside the chamber 80 with one end of each electrode protruding through lid 83b via sealable openings 85. Cathode 84 comprises a mesh cylinder 84a and a cathode rod 84b, which are electrically connected to each other and anode 86 is a cylinder that is positioned within mesh cage 84a. Electrodes of other shapes and arrangements may be used with beneficial effect. Preferably, both anode 86 and cathode 84 are made of steel, carbon, or other non-reactive material. A stable direct current, sufficient to generate the desired rate of electrolysis, is applied to cathode 84 and anode 86 from a power supply 88. Typical current densities will be in the range of about 20 A/m$^2$ to about 500 A/m$^2$. As the aqueous stream 81 flows through the contact chamber 80, water molecules are disassociated to form free radicals of hydrogen and oxygen, which recombine to form primarily hydroxy radicals. The electrolyzed effluent 82 is drawn off of the contact cell 80.

Figure 5:
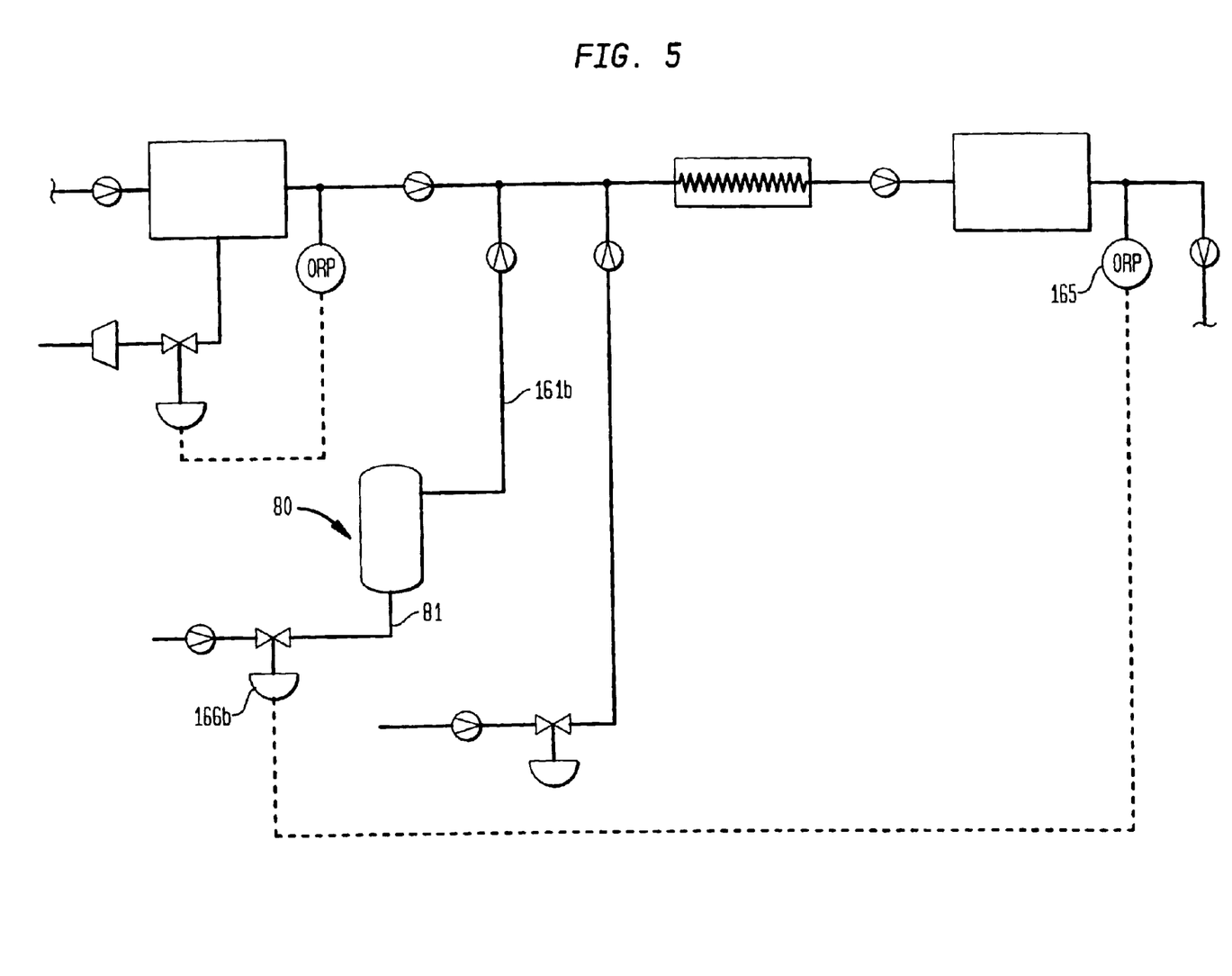
FIG. 5 is a block diagram of a two-stage chemical oxidation process comprising delivery of electrolyzed water to the second stage.

FIG. 5 presents an embodiment of the two-stage chemical treatment process of FIG. 3 wherein a contact chamber 80 is used to generate electrolyzed water from a clear water influent 81. The electrolyzed water is drawn off as oxidizing agent 161b and metered into effluent. An advantage of this embodiment is that the oxidizing agent 161b is generated, as it is needed, reducing the corrosive, explosive or flammable hazards that arise when chemical oxidants are stored or handled.

Figure 6:
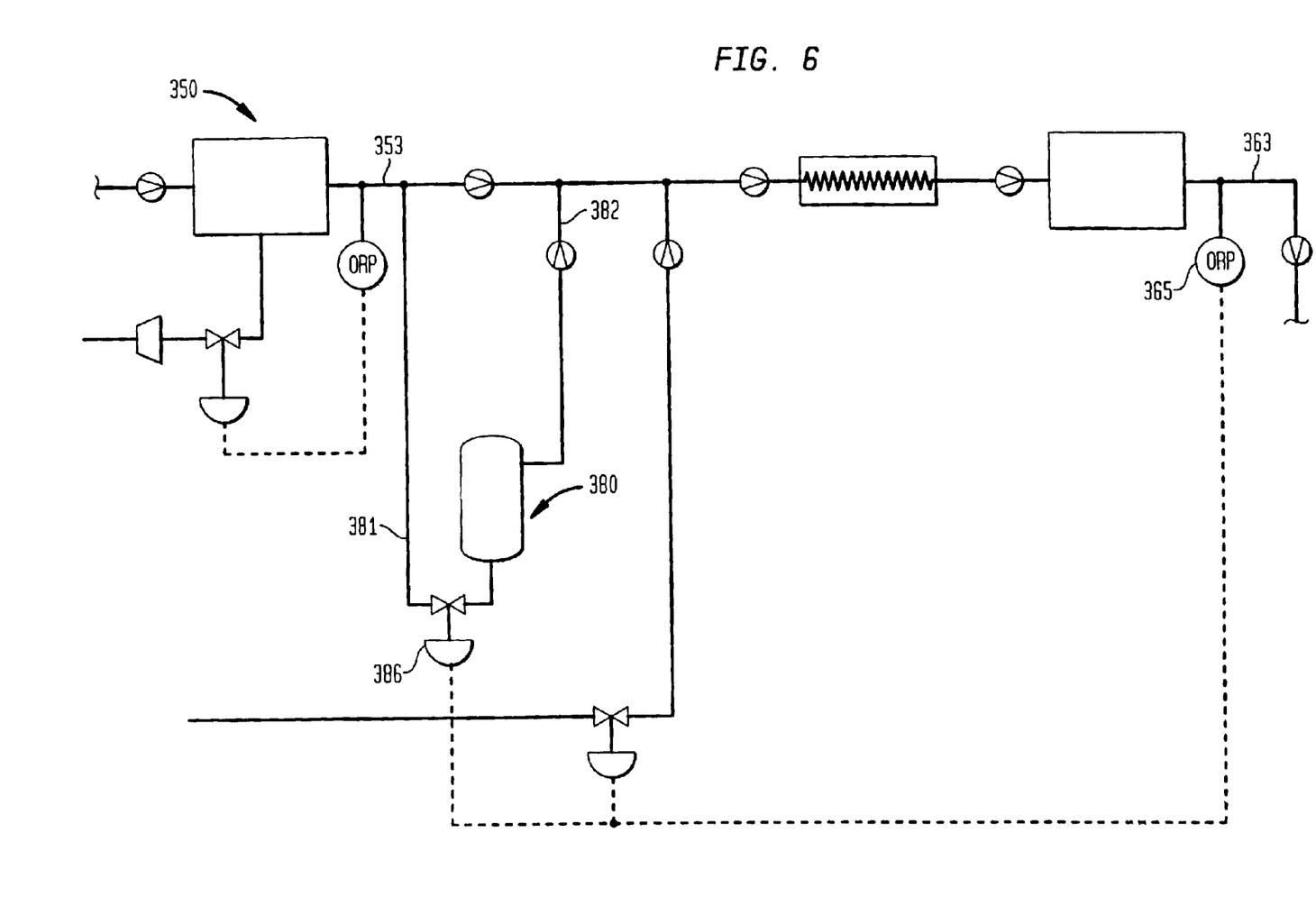
FIG. 6 is a block diagram of a two-stage chemical oxidation process comprising direct electrolysis of a portion of the first stage effluent.

FIG. 6 presents an alternative embodiment of a two-stage chemical treatment process wherein a portion 381 of the effluent 353 from a first chemical reactor 350 is diverted to a contact chamber 380 for electrolysis. The electrolyzed stream 382 is added back to effluent 353. The amount of effluent 353 that is drawn off for electrolysis is controlled by ORP monitor 365 flow controller 386 to maintain a constant ORP in effluent 363.

Figure 7:
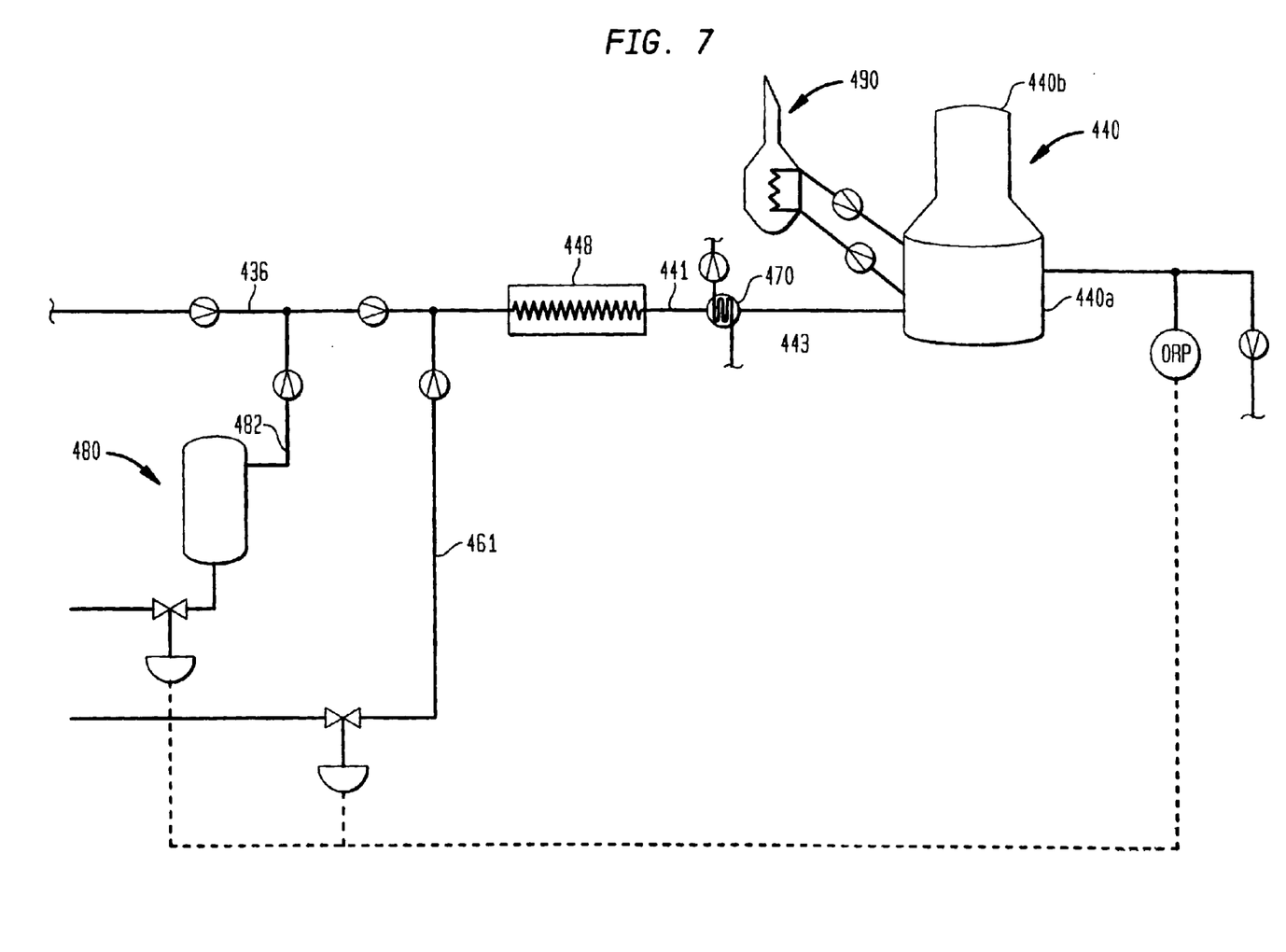
FIG. 7 is a block diagram of a single-stage chemical oxidation process wherein the process stream is refluxed with an oxidant.

Preferably, the biosolids/organics mixture is chemically treated by refluxing the mixture at pressures of about one atmosphere. As the ORP of the waste stream is increased, lower temperatures and pressures may be used to achieve the optimal treatment efficiencies. At ORP values of about +500 mV or greater, the biodegradability of the biosolids/organics mixture may be effectively improved by refluxing the mixture at atmospheric pressures. FIG. 7 presents a system in accordance with this embodiment of the present invention. Chemical oxidant 461, preferably a strong oxidant such as hypochlorous acid, and eloctrolyzed water 482 from contact chamber 480 are mixed with biosolids/organics stream 436, preferably in a mixing device 448, and discharged to chemical reactor 440. A pre-heater 470, preferably a heat exchanger using effluent 443 as its hot fluid, may be employed to raise the temperature of the mixed influent 441 while cooling reactor effluent 443 for delivery to the bioreactor 20 (FIG. 1). It is anticipated that the oxidation reactions typically will provide enough heat to maintain reflux conditions in the reactor. In some circumstances, additional heat may be required to sustain reflux. Accordingly, chemical reactor 440 may comprise a jacketed kettle 440a with an atmospheric reflux tower 440b. Additional heat is provided to the jacketed kettle 440a by means of auxiliary heater 490. ORP monitor 445 and flow controllers 446, 486 control ORP in the reactor at the targeted level of about +500 mV or greater. Preferably, treatment is carried out at about neutral pH and temperatures at about the atmospheric boiling point of the reactor contents or less. Ordinarily skilled practitioners will recognize that other parameters, such as detention time, will vary depending on reaction conditions, the desired effluent quality, and the nature of the waste streams undergoing treatment.

In every embodiment of this invention, a biosolids/organics stream is subjected to chemical oxidation to solubilize cellular materials and other organics and improve the rate at which they are degraded to gaseous and mineral forms in the bioreactor. The optimal conditions for the chemical reaction, including, but not limited to, pH, temperature, pressure and detention time, as well as selection of chemical oxidants, may be evaluated using respirometric methods. These methods typically measure the rate of oxygen uptake and/or carbon dioxide production in a known quantity of biosolids. An increased respirometric response indicates an improvement in the biodegradability of the treated waste. Therefore, in practice, the conditions of chemical treatment are adjusted to produce the best respirometric response at the bioreactor.

Figure 8:
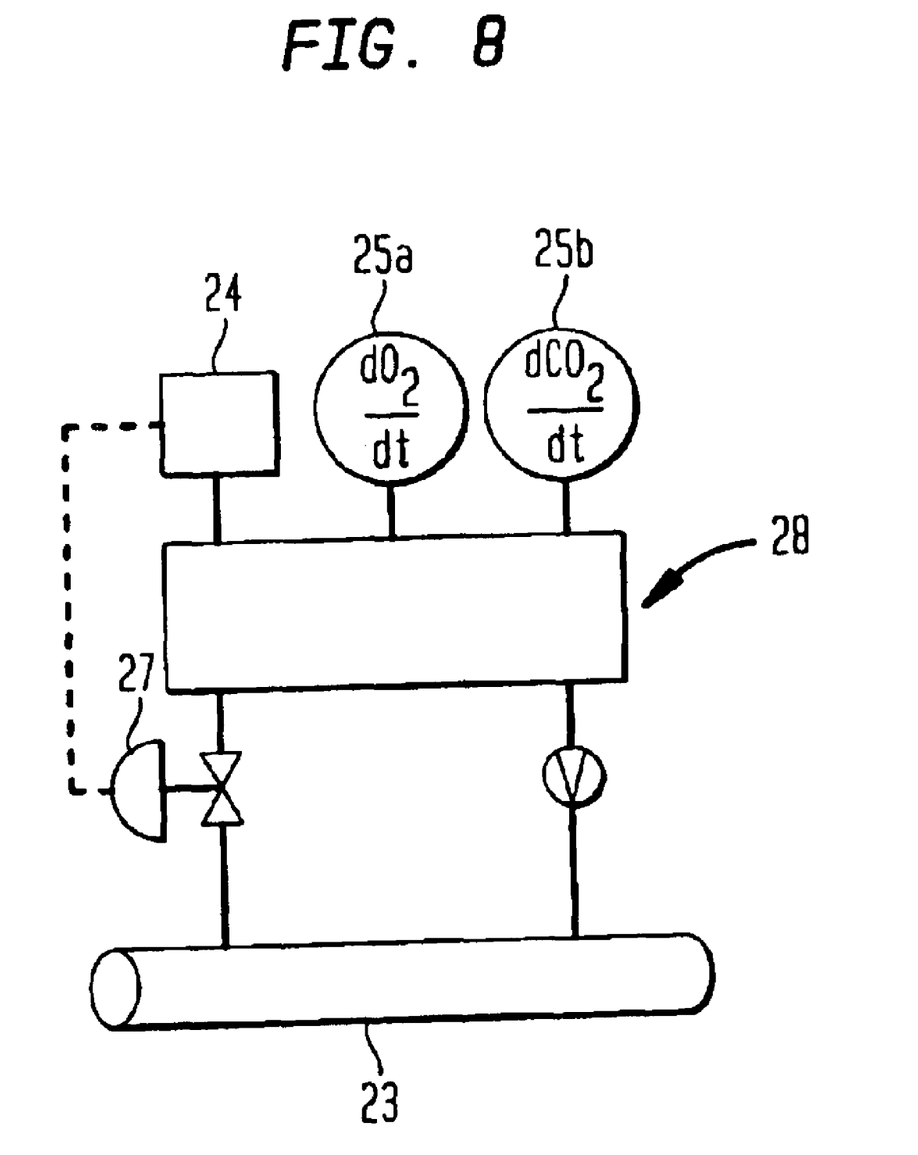
FIG. 8 is a schematic diagram of an inline respirometer.

A schematic of a typical inline respirometer 28 is shown in FIG. 8. Timer 24 opens valve 27 on a predetermined cycle, allowing a portion of biosolids/organics stream 23 to flow into device 28. Any material residing within device 28 is flushed back to stream 23 by the incoming liquid, and timer 24 closes valve 27. Monitors 25a, 25b measure changes in oxygen and carbon dioxide concentrations, respectively, in the sample over time. Process conditions are controlled accordingly to maintain the rates of concentration change within predetermined limits. Monitors 25a, 25b may also interface with flow controllers (not shown) or other process control units to regulate system performance. After a predetermined period, timer 24 opens valve 27 again, beginning a new sampling cycle.

Another aspect of the present invention relates to a process for the biological treatment of organic waste wherein the rate of biosolids production is controlled to low levels by maintaining low system net growth rates. By maintaining the system net growth rate at less than about 0.05 day$^{-1}$ and more preferably between about 0.01 day$^{-1}$ to about 0.006 day$^{-1}$, biodegradation is substantially increased relative to cell yield, thereby minimizing the recirculation of organic carbon through the system. After biodegradation, the resulting biosolids/organic mixture is preferably transferred to a solids separation unit, where the solid biosolids/organic waste is separated from the treated effluent.

Any suitable methods for maintaining low system net growth rate levels may be used. Preferably, for the present invention, a portion of the separated biosolids/organics is returned to the bioreactor to control the system net growth rate, $\mu_n$, which is the inverse of the mean cell retention time, or "sludge age", $\theta_c$. Thorough biosolids retention in a biological treatment system maintains low $\mu_n$ values in the system. This provides the system with ecological inertia that results in low observed cell yields, $Y_o$. It is essential to maintain low cell yields in a biological system that targets zero net biosolids or organic waste production, particularly if an ancillary chemical or physical treatment is utilized. The purpose of the chemical conditioning procedure is to render the targeted biosolids or waste materials biodegradable. When this biodegradable material is returned to the biological reactor after it is conditioned, it is essential that only a small fraction of the COD in the conditioned effluent be converted to biosolids. If reactor $\mu_n$ values are high, then $Y_o$ will be high and a relatively large portion of chemically conditioned material will be converted back to biosolids. Under such conditions, organic carbon essentially "spins around" in the overall system.

This aspect of the present invention provides robust control over biosolids production, maintaining a low $\mu_n$ and, consequently, low $Y_o$ values. Low $Y_o$ means that the bulk of the organic carbon in the chemically conditioned material that is returned to the bioreactor is not converted to biosolids but rather is converted to a gaseous form (e.g., carbon dioxide, methane, hydrogen, etc.) and exits the system. This is critical to keeping the overall system economics reasonable and avoiding inordinate or wasteful utilization of the chemical conditioning step. Preferably, the values of $\mu_n$ would be 0.05 day$^{-1}$ or less, which are equivalent to values of 20 days or more for $\theta_c$. More preferably, the values of $\mu_n$ would be between 0.01 day$^{-1}$ and 0.006 day$^1$, which are equivalent to values of 100 days to about 150 days for $\theta_c$. $Y_o$ values may be monitored indirectly through respirometric techniques, as discussed herein, and system conditions adjusted to maintain the selected cell yields.

Figure 9:
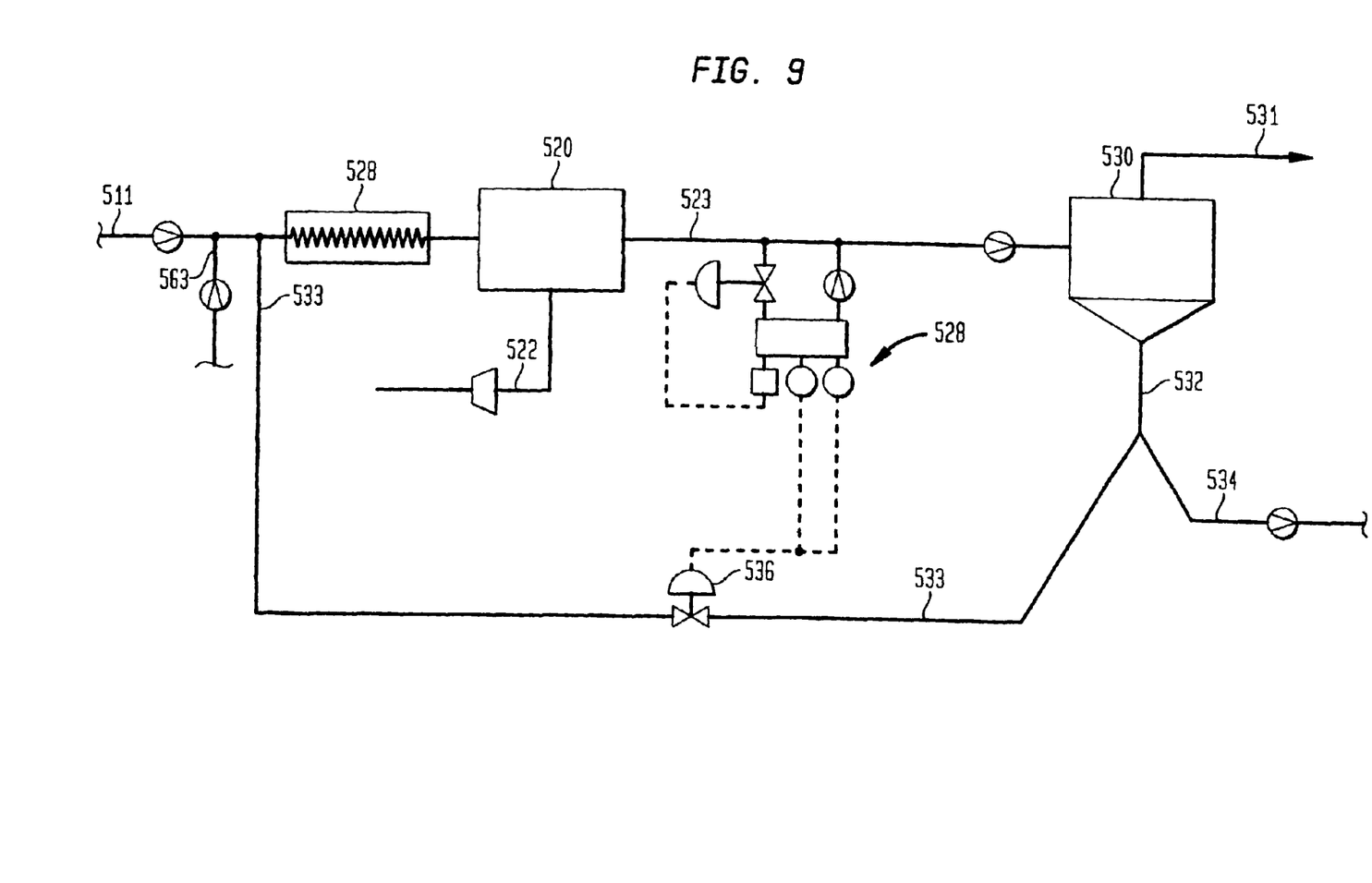
FIG. 9 is a block diagram of a bioreactor process comprising control of mean cell retention time.

FIG. 9 presents an embodiment of this aspect of the present invention. Waste stream 511 is combined with recovered biosolids 533 and effluent 563 returned from a downstream process (not shown). Preferably, the streams 511, 533, 563 are mixed in mixing device 528 before being discharged to bioreactor 520. Oxygen 522 is provided to bioreactor 520, most preferably as oxygen-enriched compressed air. The reactor contents are drawn off as stream 523 and directed to a solids separation unit, here shown as settling tank 530, where biosolids/organics are concentrated and drawn off as biosolids/organics stream 532. Clear effluent is drawn off as effluent stream 531. Inline respirometer 528 measures the respirometric activity of the biosolids in the reactor contents 523 and adjusts flow controller 536 to control the amount of biosolids/organics returned to bioreactor 520 as recovered biosolids 533, so as to maintain the desired $\mu_n$. The remainder 534 of the biosolids/organics 532 is discarded or, preferably, subjected to further treatment, most preferably by chemical treatment as discussed herein.

The preferred method of maintaining low values of $\mu_n$ and $Y_o$ is to increase $\theta^{-1}$ by retaining biosolids in the system, as discussed. Other methods that may be used to control $Y_o$ including the addition of mature cell masses to the system, the addition of enzyme preparations to increase respiration or suppress cell yield, or other methods known to the art. In a related aspect of this invention, enzyme preparations are employed to suppress biosolids production in the bioreactor. Cellular respiration can be stimulated by adding enzyme preparations to the bioreactor contents. Such stimulation results in a higher rate of biodegradation while suppressing cell yield and, effectively, reducing $\mu_n$.

Figure 10:
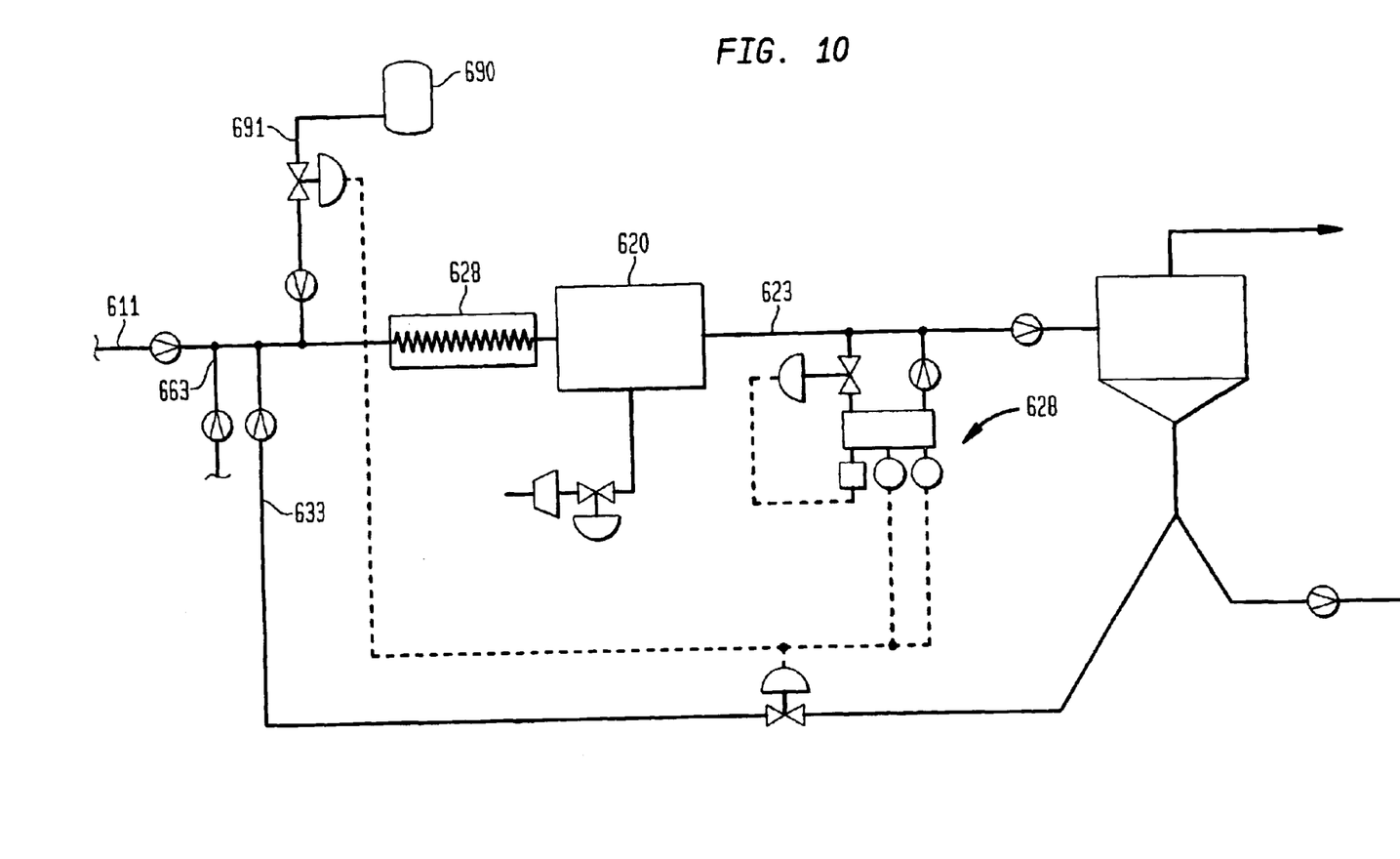
FIG. 10 is a block diagram of a bioreactor process comprising direct stimulation of endogenous respiration and control of mean cell retention time.

When integrated with other aspects of the present invention, addition of enzymes allows net biosolids production to be reduced to levels near "zero". The enzyme preparation WT-2000 (Advanced BioCatalytics Corp., 4440 Von Karman Ave., Newport Beach, Calif.) is preferred to effect such stimulation in the present invention, but other preparations may be used to similar effect. FIG. 10 presents a bioreactor system that incorporates enzyme addition and biosolids recycle. An enzyme preparation 691 is metered from vessel 690 into the combined streams 611, 633, 663, which, preferably, are mixed in mixing device 628 and discharged to bioreactor 620. Inline respirometer 628 monitors the respirometric response of reactor effluent 623 and adjusts the rate at which the enzyme preparation 691 and biosolids/organics 633 are returned to the bioreactor 620, to maintain $Y_o$ and $\mu_n$ at their targeted levels.

Figure 11:
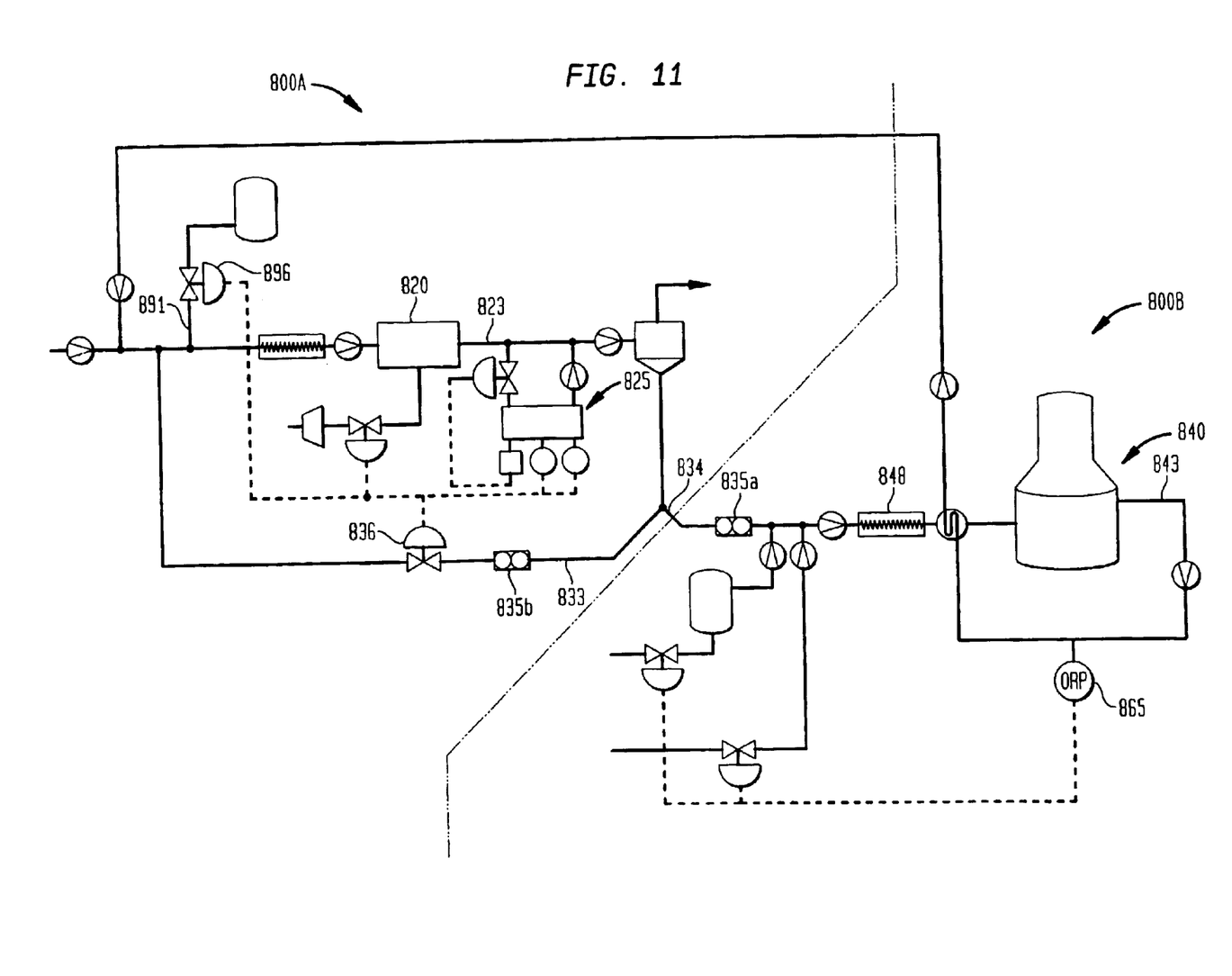
FIG. 11 is a block diagram of an integrated waste treatment system comprising a bioreactor with biosolids recycle to control mean cell retention time and two-stage chemical oxidation with direct monitoring and control of oxidation-reduction potential.

As discussed herein, chemical treatment rates can be further improved by reducing the particle size of the biosolids before they are introduced to the chemical reactor. Reduced particle sizes can also be used to improve the rate of biodegradation in the bioreactor by allowing increased oxygen transfer into the particle and increasing the rate of dissolution of soluble components from the particle. Moreover, the treatment processes can be more efficiently controlled when the biosolids particles have a known size distribution. FIG. 11, for example, illustrates the use of a mechanical device 835a to reduce the biosolid particles in stream 834 to a known size distribution for more effective treatment in chemical reactor 840. A similar device 835b is used to control the particle size distribution in biosolids/organics stream 833 returned to bioreactor 820. Various mechanical devices are known to the art for reducing particulate biosolids to a controlled size distribution. The practitioner of ordinary skill will readily recognize such devices and their applications.

Cavitation may be also be used to achieve particle size reduction, whether by hydraulic, sonic or other means. Cavitation provides an additional benefit prior to the chemical treatment step in that it produces hydroxy radicals. Alternatively, cavitation procedures can be used in the chemical treatment unit itself. For example, oxidants and chemical catalysts, such as those identified herein, may added to the biosolids/organic stream and the mixture subjected to cavitation. The cavitation creates conditions in the mixture to enhance oxidation reactions and, consequently improve the biodegradability of the biosolids/organics mixture.

An objective of the present invention is to reduce the rate of biosolids production from a biological waste treatment system to achieve essentially zero net sludge production. The present invention integrates the biological and chemical treatment systems, as well as other system features described herein, providing a suite of operating parameters that may be adjusted to accommodate various performance objectives. The goal of this integration is to obtain the best possible performance across the entire treatment system, according to technical measures such as COD removal or biosolids production, economic measures such as total cost of treatment and disposal, or by a combination of such measures. FIG. 11 presents a preferred embodiment for treatment of highly concentrated or recalcitrant wastes that realizes this objective by implementing several aspects of the invention in an integrated system. Block 800A presents the biological treatment portion of the system, discussed herein and most nearly illustrated in FIGS. 9 and 10. Block 800B represents the chemical treatment processes employed to condition the effluent to improve biodegradability of the wastes, also discussed herein, and illustrated in FIG. 8. Plant operators analyze respirometric response data from respirometer 825, in combination with the conventional water quality analyses widely known in the art, to evaluate the performance and costs of the treatment plant and modify the operating parameters to achieve the target effluent quality and economic performance. Preferably, the operator adjusts the setpoint value of ORP monitor 865 to control the quality of effluent 843 at the optimum level that promotes the conversion of COD to carbon dioxide in bioreactor 820. The flow rate of the biosolids/organics recycle stream 833 is adjusted by flow controller 836 in response to the respirometric response at respirometer 825 to maintain a low $\mu_n$ and a correspondingly low $Y_o$, reducing the net sludge production rate. Flow controller 896 meters enzyme preparation 891 to bioreactor 820 to further suppress $Y_o$. The combined effects of controlled biosolids recycle, enzyme addition, and improved biodegradability through chemical conditioning act to reduce net biosolids production to nearly zero.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A process for the treatment of organic waste comprising the steps of:
   (a) feeding organic waste to a biological reactor and subjecting said organic waste to biological digestion so as to convert at least a portion of said organic waste to a clear decant and a mixture of biosolids and unconverted organic material;
   (b) contacting a least a portion of said mixture of biosolids and unconverted organic material with at least one oxidizing agent comprising an oxidizing agent generated by electrolysis in order to chemically convert said unconverted organic material in a chemical treatment unit substantially without any biological digestion of said unconverted organic material;
   (c) monitoring the oxidation-reduction potential of said at least a portion of said mixture of biosolids and unconverted organic material in said chemical treatment unit and adjusting the concentration of said at least one oxidizing agent in contact with said at least a portion of said mixture to maintain said oxidation-reduction potential of said at least a portion of said mixture at greater than 0 mV so as to convert said at least a portion of said mixture to a conditioned effluent; and
   (d) returning said conditioned effluent to said biological reactor.

2. The process of claim 1 wherein said oxidizing agent generated by electrolysis is generated by subjecting at least a portion of said at least a portion of said mixture of biosolids and unconverted organic material to electrolysis.

3. A process for the treatment of organic waste comprising the steps of:
   (a) feeding organic waste to a biological reactor and subjecting said organic waste to biological digestion so as to convert at least a portion of said organic waste to a clear decant and a mixture of biosolids and unconverted organic material;
   (b) contacting a least a portion of said mixture of biosolids and unconverted organic material with at least one oxidizing agent comprising an oxidizing agent generated by electrolysis in order to chemically convert said unconverted organic material in a chemical treatment unit;
   (c) monitoring the oxidation-reduction potential of said at least a portion of said mixture of biosolids and unconverted organic material in said chemical treatment unit and adjusting the concentration of said at least one oxidizing agent in contact with said at least a portion of said mixture to maintain said oxidation-reduction potential of said at least a portion of said mixture at greater than 200 mV so as to convert said at least a portion of said mixture to a conditioned effluent; and
   (d) returning said conditioned effluent to said biological reactor.

* * * * *

UNITED STATES PATENT AND TRADEMARK OFFICE
CERTIFICATE OF CORRECTION

PATENT NO. : 6,783,679 B1  
DATED : August 31, 2004  
INVENTOR(S) : Alan F. Rozich It is certified that error appears in the above-identified patent and that said Letters Patent is hereby corrected as shown below:

Title page,
Item [57], ABSTRACT,
Line 14, delete "act".

Column 1,
Line 16, "system" should read -- systems --.
Line 26, delete ",".

Column 3,
Line 22, delete ",".

Column 4,
Line 6, delete "a" (first instance) and insert therefor -- at --.

Column 7,
Line 39, delete "is" and insert therefor -- are --.

Column 12,
Line 4, "including" should read -- include --.

Column 14,
Lines 1 and 30, delete "a" (first instance) and insert therefor -- at --.

Signed and Sealed this

Eighth Day of February, 2005

JON W. DUDAS  
*Director of the United States Patent and Trademark Office*